US006758388B1

(12) United States Patent
Leholm et al.

(10) Patent No.: US 6,758,388 B1
(45) Date of Patent: Jul. 6, 2004

(54) TITANIUM ALUMINIDE HONEYCOMB PANEL STRUCTURES AND FABRICATION METHOD FOR THE SAME

(75) Inventors: Robert Barry Leholm, Santee, CA (US); Kenneth Lynn Schertzer, Sr., Imperial Beach, CA (US); Steven Allen Good, San Diego, CA (US); Ronald Harry Widmer, San Deigo, CA (US); James Schneider, Jr., San Diego, CA (US); Coif Dean Seale, Chula Vista, CA (US)

(73) Assignee: Rohr, Inc., Chula Vista, CA (US)

( * ) Notice: Subject to any disclaimer, the term of this patent is extended or adjusted under 35 U.S.C. 154(b) by 21 days.

(21) Appl. No.: 10/021,785

(22) Filed: Dec. 14, 2001

Related U.S. Application Data (63) Continuation of application No. 09/794,567, filed on Feb. 27, 2001, now abandoned.

(51) Int. Cl.[7] .................. B23K 31/02; B23K 20/00; B23K 28/00; B23K 35/12

(52) U.S. Cl. .................. 228/181; 228/193; 228/252

(58) Field of Search ........................ 228/181

(56) References Cited

U.S. PATENT DOCUMENTS

| | | | |
|---|---|---|---|
| 3,768,985 A | 10/1973 | Woodward ................. 29/191 |
| 3,769,101 A | 10/1973 | Woodward ................. 148/127 |
| 3,981,429 A | 9/1976 | Parker ....................... 228/194 |
| 4,221,257 A | 9/1980 | Narasimhan .............. 164/87 |
| 4,429,824 A | 2/1984 | Woodward ................. 228/157 |
| 4,869,421 A | 9/1989 | Norris et al. .............. 228/181 |
| 4,893,743 A | 1/1990 | Eylon et al. ............... 228/181 |
| 5,199,631 A | 4/1993 | Anderson et al. ......... 228/181 |
| 5,222,282 A * | 6/1993 | Sukonnik et al. ......... 29/17.9 |
| 5,318,214 A | 6/1994 | Lucas, Jr. et al. ......... 228/121 |
| 5,333,993 A | 8/1994 | Stueber et al. ............ 415/164.5 |
| 5,350,637 A * | 9/1994 | Ketcham et al. .......... 428/539.5 |
| 5,403,411 A * | 4/1995 | Smith et al. ............... 148/514 |
| 6,149,051 A | 11/2000 | Vollmer et al. ........... 228/262.72 |
| 6,223,976 B1 * | 5/2001 | Clement et al. .......... 228/248.5 |
| 6,387,541 B1 * | 5/2002 | Gray et al. ................ 128/660 |
| 6,475,637 B1 * | 11/2002 | Strutt et al. ............... 424/513 |

FOREIGN PATENT DOCUMENTS

| | | |
|---|---|---|
| JP | 56169363 | 12/1981 |
| JP | 4160126 | 6/1992 |
| JP | 7188946 | 7/1995 |

OTHER PUBLICATIONS

Q. Xu. M. C. Chaturvedi. N. L. Richards and N. Goel, "Diffusion Brazing of a Ti–45Al–Nb–2Mn+0.8vol% $TiB_2$ XD Alloy," Structural Intermetallics (1997), pp. 323–329.

C. A. Blue, R. A. Blue and R. Y. Lin. "Microstructural Evolution in Joining of TiAl with a Liquid Ti Alloy," Scripta Metallurgica et Materialia, vol. 32 (1995), pp. 127–132.

D. Eylon and S. R. Seagle, "Titanium Technology in the USA—an Overview," J. Mater. Sci. Technol., vol. 17 (2001), pp. 439–443.

(List continued on next page.)

*Primary Examiner*—Stanley S. Silverman
*Assistant Examiner*—Colleen P. Cooke
(74) *Attorney, Agent, or Firm*—Goodwin Procter LLP (57) ABSTRACT

Disclosed are different titanium aluminide (Ti—Al) honeycomb panel structures formed from a gamma-based Ti—Al (γ-Ti—Al) or orthorhombic Ti—Al (O—Ti—Al) honeycomb core brazed to a γ-Ti—Al or O—Ti—Al facing sheet(s), where a metal braze filler foil containing copper and one or more other metals is used to join the faying surface of the honeycomb core and the faying surface of the facing sheet(s). The structures and method of the invention are useful where high strength, lightweigth materials are required, such as in aircraft and other aerospace-related applications.

34 Claims, 4 Drawing Sheets

OTHER PUBLICATIONS

D. Eylon, S. Fujishiro and F. H. Froes, "Titanium Alloys for High Temperature Applications—A Review," High Temperature Materials and Processes, vol. 6 (1984), pp. 81–91.

A. Giamei, "Intermetallics," Advanced Materials & Processes, (Jan. 1990), pp. 35 and 88.

S. L. Semiatin, V. Seetharaman, and I. Weiss, "Hot Workability of Titanium and Titanium Aluminide Alloys—an overview," Materials Science and Engineering, vol. A243 (1988), p. 1–24.

D. M. Dimiduk, D. B. Miracle and C. H. Ward, "Intermetallic Materials for Aerospace Systems—An Overview of Development," pp. 144–158.

G. Sauthoff, "State of Intermetallics Development," Materials and Corrosion, vol. 47 (1996), pp. 589–594.

E. P. George, M. Yamaguchi, K. S. Kumar and C. T. Liu, "Ordered Intermetallics," Annu. Rev. Mater. Sci., vol. 24 (1994), pp. 409–451.

Table titled "Matrix Summary of the Bond Joint Characteristics of the Three Different Brazing Techniques for Reactive Metals".

Kalin et al., "Amorphous Strip Brazing Alloys for High–Temperature Brazing. Experience with Developing Production Technology and Application", *Welding International, Welding Institute*, Abington, GB, vol. 10, Nr. 7 (1996), pp. 578–581.

B.A. Kalin et al., "Brazing Thin Sheet Structures of Titanium Alloys Using STEMET Amorphous Brazing Alloys," in Welding International, pp. 234–235 (1997).

* cited by examiner

TITANIUM ALUMINIDE HONEYCOMB PANEL STRUCTURES AND FABRICATION METHOD FOR THE SAME

This Application is a continuation of Ser. No. 09/794,567 filed Feb. 27, 2001 abandoned

BACKGROUND OF THE INVENTION

1. Field of the Invention

The present invention relates to honeycomb panel structures and a method of preparing such structures.

2. Background Information

Diffusion brazing and bonding methods for the joining of honeycomb sandwich panels and other titanium structures are known to those skilled in the art. However, as described for example in U.S. Pat. Nos. 3,768,985 and 3,769,101, such diffusion brazing and bonding techniques have not been found entirely satisfactory, especially for joining titanium-based components such as joining a titanium honeycomb core material to a titanium facing sheet. In response to the problems associated with such diffusion brazing and bonding methods, U.S. Pat. No. 3,768,985 describes a combined brazing and diffusion process referred to as a liquid interface diffusion (LID) process, also known as transient liquid phase (TLP) bonding, for joining a titanium honeycomb core and a titanium facing sheet bonded thereto. A brazing or filler material containing 38% Cu, 38% Ni and a balance of Ag (by weight) is interposed between the faying surfaces of the honeycomb core and facing sheet, and the brazing material is rendered liquid at the brazing temperature to form a liquid interface between the faying surfaces which establishes the required metal-to-metal contact therebetween so that atomic transport can be effected and diffusion accelerated. In addition, U.S. Pat. No. 3,769,101 describes a LID process in which a small amount of three or more selected metals are interposed between the faying edges of the material to be bonded, to form a diffusion bridge. The selected metals may be Cu, Ni and Ag, or Cu, Ni and one low melting point metal selected from the group consisting of Sb, Bi, Cd, Sn, Zn, Au and Pt.

However, there are several additional problems associated with the LID process itself. For example, it is often difficult to achieve sufficient bonding of mismatched faying surfaces. In addition, disbonding of the surfaces after initial bonding also may occur, which may require post-processing repairs such as the introduction of pins and the like to join the surfaces with sufficient mechanical integrity. In view of the foregoing, it would be desirable to employ a process which is capable of sufficiently bonding slightly mismatched faying surfaces, and reduces the incidence of disbanding of the initially bonded surfaces and the concomitant necessity to use pins and the like to sufficiently join the surfaces.

As an alternative to LID, diffusion has been employed as described, for example, in U.S. Pat. No. 4,893,743. However, in order to achieve diffusion bonding, it normally becomes necessary to establish an.ultraclean condition of the parts, and to employ high pressure and temperature for extended periods of time without causing gross deformation and degradation of mechanical properties which might result from use of excessive time, temperature, or pressure. Honeycomb structures typically require a low bonding pressure, to avoid the risk of cracking the core.

The use of amorphous Ti-based brazing alloys for diffusion brazing and bonding of thin sheet structures of titanium and its alloys is described in B. A. Kalin et a., "Brazing Thin Sheet Structures of Titanium Alloys Using STEMET Amorphous Brazing Alloys," in Welding International, pp. 234–35 (1997). However, relatively short bonding times (i.e. 5–30 minutes) are described, which tend to limit the degree of atomic diffusion and homogenization of the joint formed between the honeycomb core and facing sheet.

The use of titanium aluminide (Ti—Al) alloys has been described for example in U.S. Pat. No. 5,318,214 and in U.S. Pat. No. 4,869,421 (both patents are herein incorporated by reference in their entireties). As disclosed in the '214 patent, LID typically requires the system to be maintained for about 80–90 minutes at bonding temperatures. Chaturvedi et al. have disclosed diffusion brazing of an alloy containing titanium, aluminum, niobium, and manganese with a titanium-copper-nickel metal foil, but they have not discussed its application to honeycomb structures.

In view of the above, there is a need in the art for a titanium aluminide honeycomb structure capable of being prepared by brazing with improved braze properties.

SUMMARY OF THE INVENTION

Accordingly, it is an object of the present invention to provide titanium aluminide (Ti—Al) structures with improved braze properties and a method of preparing such structures. More specifically, it is an object of the present invention to provide a honeycomb structure containing a titanium aluminide alloy honeycomb core joined to at least one Ti—Al alloy facing sheet by a diffusion brazed composition zone formed from a metal foil containing copper, titanium, and optionally nickel, which joins the faying surfaces of the honeycomb core and facing sheet(s) by being rendered liquid at the brazing temperature and thereby forming a liquid interface that extensively diffuses into the core and facing sheet(s). It is another object of the invention to provide a method of preparing such a structure. The use of the diffusion brazed composition zone advantageously enables the brazing of such Ti—Al alloy components, including the brazing of slightly mismatched faying surfaces of such components, which reduces the incidence of disbonding of the initially joined surfaces and the concomitant necessity to use pins and the like to sufficiently join the surfaces. The structure and method of the invention are useful in applications where high strength, lightweight materials are required, such as in aircraft and aerospace-related applications.

The present invention provides a Ti—Al honeycomb panel structure which includes a Ti—Al alloy honeycomb core and at least one Ti—Al alloy facing sheet brazed thereto with a diffusion brazing composition. The honeycomb structure is prepared by a method including:

(a) providing Ti—Al alloy honeycomb core having a faying surface and at least one Ti—Al alloy facing sheet having a faying surface;

(b) contacting the honeycomb core faying surface and the at least one facing sheet faying surface, and positioning therebetween a metal braze filler foil containing copper, titanium, and optionally nickel, to form a braze assembly;

(c) subjecting the braze assembly to sufficient positive pressure to maintain position and alignment for joining; and (d) heating the braze assembly for a sufficient amount of time to join the honeycomb core with the at least one facing sheet.

In a first embodiment, the honeycomb structure is a hybrid Ti—Al honeycomb structure in which said the facing sheet(s) is a gamma-based Ti—Al ("γ-Ti—Al") facing sheet having a thickness of 0.007 to 0.040 inches and the core is fabricated from orthorhombic Ti—Al ("O—Ti—Al") foil gauges having a thickness of about 0.003 inches. In a second embodiment, the honeycomb structure is an all γ-Ti—Al honeycomb structure, in which the Ti—Al alloy used for the fabrication of the core is γ-Ti—Al and the Ti—Al alloy used for the facing sheet(s) is also γ-Ti—Al. In one particularly preferred embodiment, the core is fabricated from γ-Ti—Al foil gauges having a thickness of about 0.004 inches. In a third embodiment, the honeycomb structure is an all O—Ti—Al honeycomb structure, in which the Ti—Al alloy used for the fabrication of the core is O—Ti—Al and the Ti—Al alloy used for the facing sheet(s) is also O—Ti—Al. In one particularly preferred embodiment, the core is fabricated from γ-Ti—Al foil gauges having a thickness of about 0.003 inches. γ-Ti—Al alloys may include PM γ-MET, supplied by Plansee of Reutte, Austria.

In another preferred embodiment, the metal braze filler foil contains copper, titanium, nickel, and zirconium.

In yet another preferred embodiment, the metal braze filler foil contains copper and titanium and is essentially free of nickel.

In a particularly preferred embodiment, the metal braze filler foil is formed by a rapid solidification process or a melt spinning process.

These and other advantages of the present invention will become more readily apparent from the brief description of the drawings and the detailed description of the invention, which are set forth below.

DETAILED DESCRIPTION OF THE INVENTION

Figure 1:
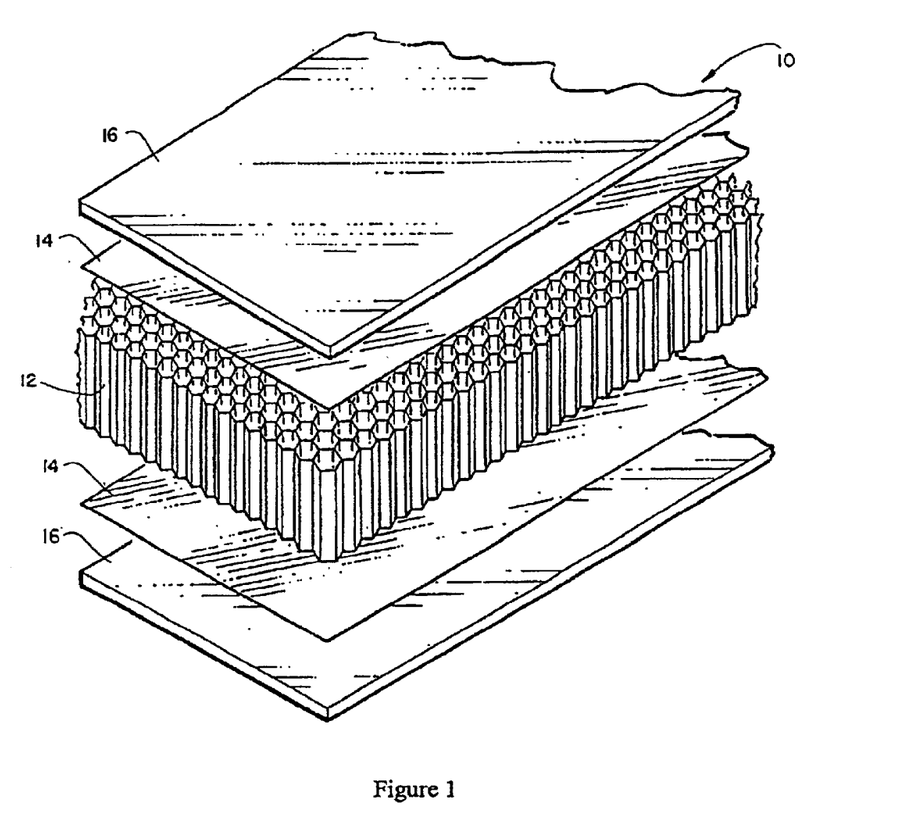
FIG. 1 is a perspective view of an embodiment of the assembly of the components as used in the structure of the present invention.

Reference is now made to FIG. 1 herein. In FIG. 1, a perspective view of an assembly (10) that includes a honeycomb core (12), a pair of braze metal foils (14), and a pair of face sheets (16) is disclosed. The method of the present invention is performed by applying low but sufficient positive pressure to the faying surfaces and metal braze filler foil therebetween (i.e. the braze assembly) to maintain position and alignment for joining. Fixturing arrangements which may be used in conjunction with the invention include the application of positive pressure by flex-weight loading, differences in gas pressure (as described in U.S. Pat. No. 5,199,631, incorporated herein by reference), and the application of differences in the coefficient of thermal expansion of fixturing devices (as described in U.S. Pat. No. 4,429,824, incorporated herein by reference). The braze assembly is then heated under suitable conditions to a temperature that allows melting of the metal braze filler foil with both the core alloy and the face sheet alloy. The assembly is held at the chosen temperature for a sufficient amount of time to allow melting of the metal braze filler foil and provide substantially complete wetting of the faying surfaces and diffusion to a desired degree in the core and facing sheet.

The invention uses a relatively thick (0.0008 to 0.006 in., preferably about 0.002 in.) metal braze filler foil of an alloy containing copper, titanium, and optionally nickel. When the metal braze filler foil contains nickel, it may further include zirconium. The filler metal must be capable of melting and become active in the joint area. It must also be capable of extensively diffusing into the base metal. The thick metal braze filler foil provides advantages over the thin LID foil in that it decreases the incidence of disbonds in slightly mismatched faying surfaces. The diffusion brazing times required are typically about 30 to 90 minutes.

Preferably, the assembly may be heated to a temperature in the range of about 1700° F. to 2200° F. for a braze soak time of between 1 minute and 150 minutes, to cause melting of the metal foil and brazing of the honeycomb core and facing sheet(s) faying surfaces. In one preferred embodiment, the assembly is heated to a temperature of about 1900° F. for at least 30 minutes in a protective atmosphere such as a vacuum furnace and thereafter cooled to room temperature. In another preferred embodiment, the assembly is heated to a temperature of about 1800° F. and held at that temperature for about 30 minutes in a protective atmosphere such as a vacuum furnace and thereafter cooled to room temperature. In a particularly preferred embodiment, the assembly is heated in a protective atmosphere such as a vacuum furnace at a heating rate of about 10–20° F./minute to a temperature just below the solidus temperature of the metal braze filler foil, and thereafter further heated at a heating rate of about 30° F./min. to a temperature just above the filler foil liquidus temperature for about 30 minutes, followed by a controlled cooling of the assembly to room temperature.

Figure 2:
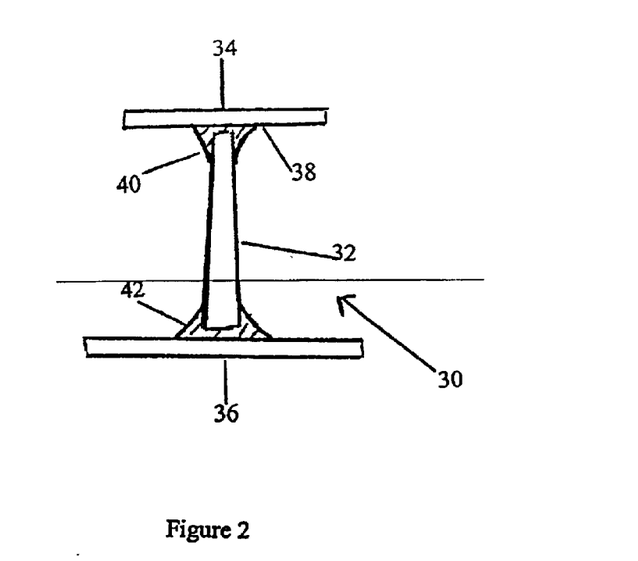
FIG. 2 is a schematic section view taken perpendicular to the surface of the assembly after brazing.

The method of the invention results in the formation of a diffusion brazed composition zone that joins a Ti—Al alloy honeycomb core with a Ti—Al alloy facing sheet(s) brazed where the region of the brazed joint therebetween includes a substantially crack-free interface. Reference is now made to FIG. 2 herein. The cross sectional schematic view in FIG. 2 graphically represents the effects characteristic of the diffusion brazing process of the present invention. When the core (32), top face sheet (34) and bottom face sheet (36) are brought together under low but sufficient pressure and heated to the melting temperature of the braze metal filler foil, the braze metal filler foil melts and diffuses into a diffusion zone (38) into the adjacent face sheet and core edge regions. Braze solidification occurs, with the top braze fillet (40) and bottom braze fillet (42) joining the core to the top face sheet (34) and bottom face sheet (36), respectively, whereupon the assembly (30) is allowed to cool, forming a smooth joint as seen in FIG. 2.

The diffusion brazing method of the invention includes:
(a) providing Ti—Al alloy honeycomb core having a faying surface and at least one Ti—Al alloy facing sheet having a faying surface;
(b) contacting the honeycomb core faying surface with the at least one facing sheet faying surface, and positioning therebetween a metal braze filler foil containing copper, titanium, and optionally nickel, to form a braze assembly;
(c) subjecting the braze assembly to sufficient positive pressure to maintain position and alignment for joining; and
(d) heating the braze assembly for a sufficient amount of time to join the honeycomb core with the at least one facing sheet.

Although not limited thereto, the method of the invention is particularly applicable to the brazing of honeycomb sandwich panel structures formed from γ-Ti—Al alloys, O—Ti—Al alloys, or γ-Ti—Al alloys and O—Ti—Al alloys.

As described above, the metal braze filler foil used in accordance with the invention is a metal foil containing copper, titanium, and optionally nickel. When the metal braze filler foil contains nickel, it may further include zirconium. Preferably, the metal braze filler foil contains about 15–23 wt. % copper, about 53–70 wt. % titanium, about 12–15 wt. % nickel, and about 0–12% zirconium. In a particularly preferred embodiment of the invention, the braze filler metal foil is an amorphous, rapidly solidified or melt-spun metal foil formed by either a rapid solidification process or a melt spinning process. Metal foils employed in the invention may be made by the method described in U.S. Pat. No. 4,221,257, which is incorporated herein by reference in its entirety. The metal foil typically has a thickness of about 0.001 inches for the system containing titanium, zirconium, nickel, and copper, and of about 0.002 inches for the system containing titanium, nickel and copper but not including zirconium. The metal foil may include STEMET 1201, available from Mifi-Ameto of Moscow, Russia.

The structure and method of the invention are further illustrated by the following examples, which are not intended to limit the invention in any way.

EXAMPLE 1

Hybrid Ti—Al Honeycomb StructureA Ti—Al honeycomb structure was prepared from a 0.01 in. thick solid γ-Ti—Al face sheet, a 0.5 in. high core made from 0.003 in. thick O—Ti—Al foil ribbon, and a second 0.01 in. thick solid γ-T—Al face sheet by placing the faying surfaces of the core and face sheets together, with a 0.002 in. thick metal braze filler foil having a nominal composition of 15 wt. % Cu, 15 wt. % Ni, and 70 wt. % Ti. The assembly was subjected to sufficient positive pressure to maintain position and alignment for joining, and the assembly was heated in a vacuum furnace as follows:

(1) Heated at 20° F./min. up to a temperature of 1650° F.;
(2) Subsequently heated at 30° F./min. up to a temperature of 1800° F.;
(3) Held at 1800° F. for 30 minutes; and
(4) Cooled to room temperature.

EXAMPLE 2

All γ-Ti—Al Honeycomb Structure

A Ti—Al honeycomb structure was prepared from a 0.01 in. thick solid γ-Ti—Al face sheet, a 0.5 in. high core made from 0.004 in. thick γ-Ti—Al foil ribbon, and a second 0.01 in. thick solid γ-Ti—Al face sheet by placing the faying surfaces of the core and face sheets together, with a 0.002 in. thick metal foil having a nominal composition of 70 wt. % Ti, 15 wt. % Cu, and 15 wt. % Ni. The assembly was subjected to sufficient positive pressure to maintain position and alignment for joining, and the assembly was heated in a vacuum furnace as follows:

(1) Heated at 20° F./min. up to a temperature of 1650° F.;
(2) Subsequently heated at 30° F./min. up to a temperature of 1900° F.;
(3) Held at 1900° F. for 30 hours; and
(4) Cooled to room temperature.

EXAMPLE 3

All O—Ti—Al Honeycomb Structure

A Ti—Al honeycomb structure was prepared from a 0.01 in. thick solid O—Ti—Al face sheet, a 0.5 in. high core made from 0.003 in. thick O—Ti—Al foil ribbon, and a second 0.01 in. thick solid O—T—Al face sheet by placing the faying surfaces of the core and face sheets together, with a 0.002 in. thick metal foil having a nominal composition of 70 wt. % Ti, 15 wt. % Cu, and 15 wt. % Ni. The assembly was subjected to sufficient positive pressure to maintain position and alignment for joining, and the assembly was heated in a vacuum furnace as follows:

(1) Heated at 20° F./min. up to a temperature of 1650° F.;
(2) Subsequently heated at 30° F./min. up to a temperature of 1800° F.;
(3) Held at 1800° F. for 30 minutes; and
(4) Cooled to room temperature.

Additional honeycomb structures were prepared in accordance with the above examples in which the thickness of the braze metal filler foil was varied from 0.001 to 0.003 inches. The resulting brazed systems were tested for maximum micro-hardness gradient, overlap shear strengths, flatwise tension strength (skin to core), and flexure strength.

Figure 3:
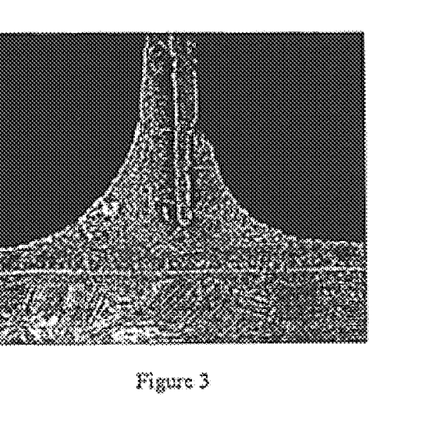
FIG. 3 is a photomicrograph of a braze joint cross section for a hybrid Ti—Al honeycomb structure.
Figure 4:
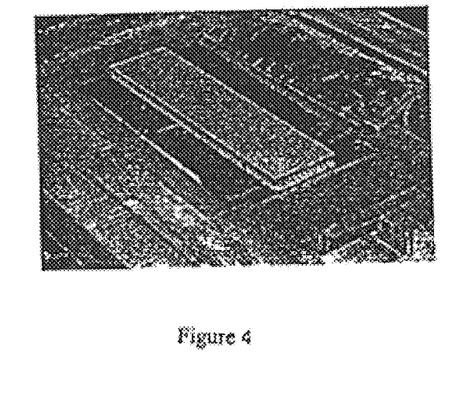
FIG. 4 is a photograph of an as-brazed hybrid Ti—Al honeycomb panel.
Figure 5:
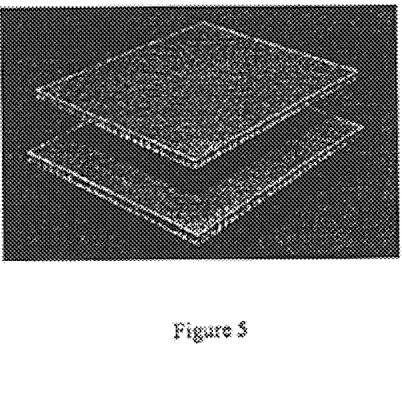
FIG. 5 is a photograph of two hybrid Ti—Al panels.

A cross section photomicrograph of a braze joint cross section for a hybrid Ti—Al honeycomb structure prepared in accordance with the above examples is shown in FIG. 3. A photograph of an as-brazed hybrid Ti—Al honeycomb panel is shown in FIG. 4. A photograph of two hybrid Ti—Al panels is shown in FIG. 5.

Figure 6:
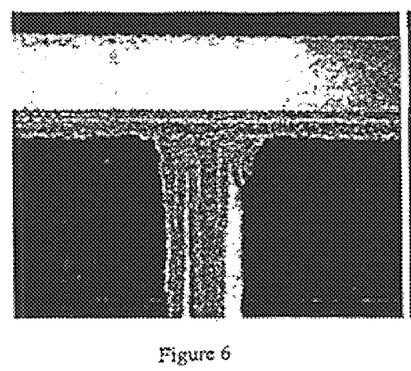
FIGS. 6 and 7 are photomicrographs of braze joint cross section of a top section for an all γ-Ti—Al honeycomb structure.
Figure 7:
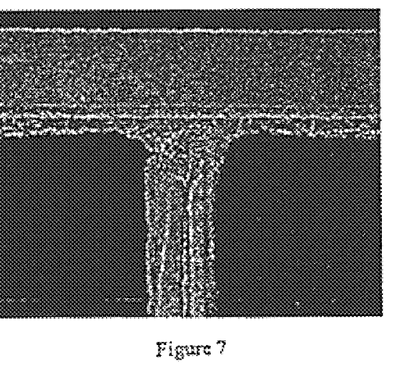
Figure 8:
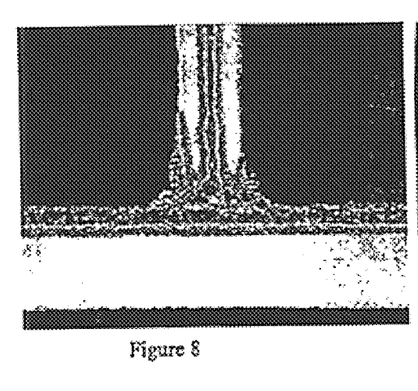
FIGS. 8 and 9 are photomicrographs of braze joint cross section of a bottom section for an all γ-Ti—Al honeycomb structure
Figure 9:
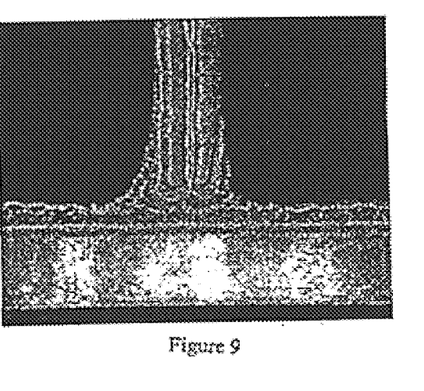
Figure 10:
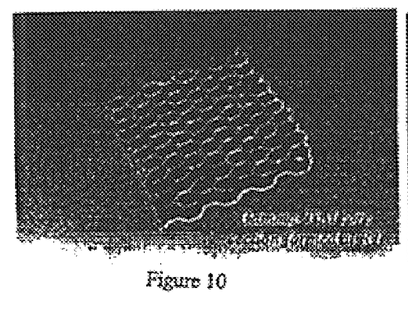
FIG. 10 is a photograph of a section of γ-Ti—Al core fabricated at room temperature
Figure 11:
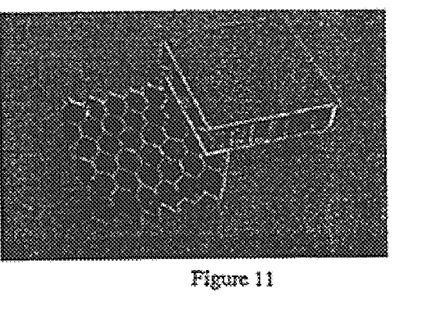
FIG. 11 is a photograph of a 3"×3" all γ-Ti—Al honeycomb panel with the core section that was used.

Photomicrograph cross sections of a top section for an all γ-Ti—Al honeycomb structure prepared in accordance with the above examples are shown in FIGS. 6 and 7. Photomicrograph cross sections of a bottom section for an all γ-Ti—Al honeycomb structure prepared in accordance with the above examples are shown in FIGS. 8 and 9. A photograph of a section of γ-Ti—Al core fabricated at room temperature is shown in FIG. 10. A photograph of a 3"×3" all γ-Ti—Al honeycomb panel with the core section that was used in FIG. 10 is shown in FIG. 1.

Figure 12:
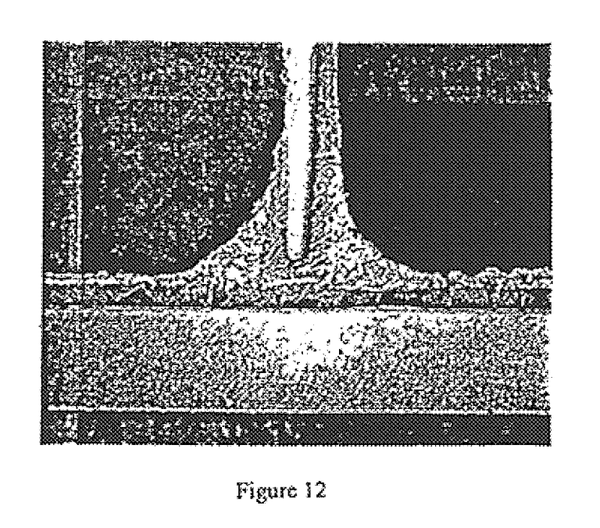
FIG. 12 is a photomicrograph of a braze joint cross section for an all O—Ti—Al honeycomb structure.
Figure 13:
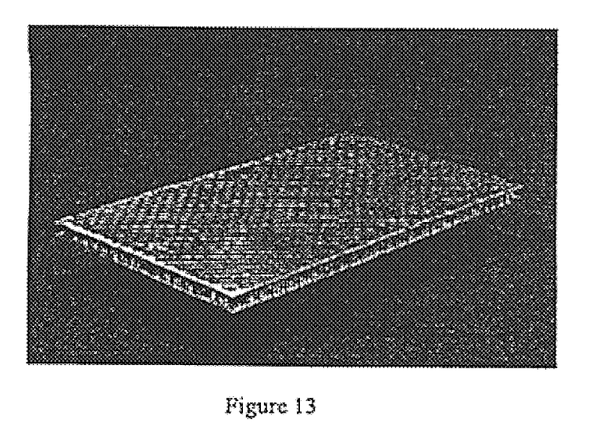
FIG. 13 is a photograph of an all O—Ti—Al panel.
Figure 14:
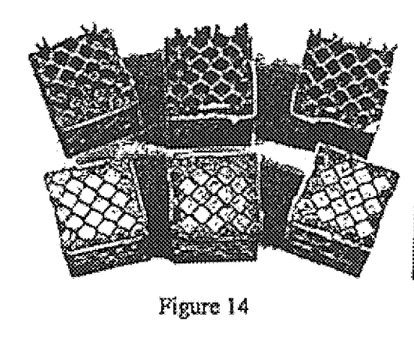
FIG. 14 is a photograph of three face skin-to-core flatwise tension specimens after testing.
Figure 15:
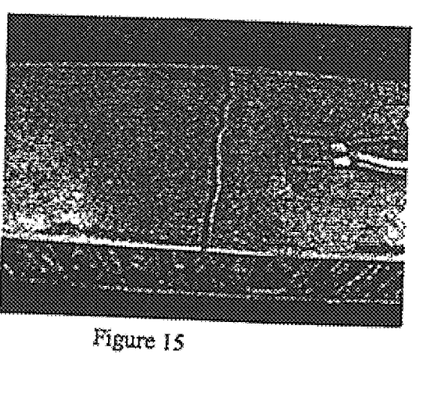
FIG. 15 is a photograph of a honeycomb flexure specimen after testing.

A cross section photomicrograph of a braze joint cross section for an O—Ti—Al honeycomb structure prepared in accordance with the above examples is shown in FIG. 12. A photograph of an all O—Ti—Al panel is shown in FIG. 13.

photo of tree face skin-to-core flatwise tension specimens after testing is shown in FIG. 14. A photo of a honeycomb flexure specimen after testing is shown in FIG. 15. The above mechanical properties for the additional honeycomb structures are set forth in Table 1.

TABLE 1

Typical screen testing results of the successful brazes used to join O—Ti—Al core to γ-Ti—Al facing sheet

| Braze Metal Filler Foil | Braze Temperature of Test Honeycomb Panel (° F.) | Micro-Hardness Gradient in Braze Joint (knoop hardness) | Overlap Shear Strengths (psi) | Flatwise Tension Strength (skin to core) (psi) | Flexure Strength (skin to core) (psi) |
| --- | --- | --- | --- | --- | --- |
| 1) Ti—Cu—Ni | 1800 | 236 | 5640 | 1562–2586 | N/T |
| | 1900 | N/T | 5210 | 954–4649 | >67,000 |
| | 2000 | 342 | 5190 | 2146–3198 | N/T |
| 2) Ti—Zr—Cu—Ni | 1800 | 318 | 2885* | 2016–2079 | N/T |
| | 1900 | N/T | 2541 | 2672–2869 | N/T |
| | 2000 | 297 | 2694 | 2133–3202 | N/T |

*Initial value of 771 was measured and determined to be an unrepresentative value.

Although the invention has been illustrated by reference to various specific embodiments, it will be apparent to those skilled in the art that various changes and modifications may be made which clearly fall within the scope of the invention.

We claim:

1. A titanium aluminide (Ti—Al) alloy honeycomb panel structure prepared by a diffusion brazing method comprising:
    (a) providing Ti—Al alloy honeycomb core having a faying surface and at least one Ti—Al alloy facing sheet having a faying surface;
    (b) contacting said honeycomb core faying surface and said at least one facing sheet faying surface, and positioning therebetween a metal braze filler foil containing copper, titanium, zirconium and optionally nickel, to form a braze assembly;
    (c) subjecting said braze assembly to sufficient positive pressure to maintain position and alignment for joining, and
    (d) heating said braze assembly for a sufficient amount of time to join said honeycomb core with said at least one facing sheet.

2. The structure of claim 1, wherein said Ti—Al alloy of said honeycomb core and of said at least one facing sheet is γ-Ti—Al.

3. The structure of claim 1, wherein said Ti—Al alloy of said honeycomb core is orthorhombic Ti—Al and said Ti—Al alloy of said at least one facing sheet is γ-Ti—Al.

4. The structure of claim 1, wherein said Ti—Al alloy of said honeycomb core and of said at least one facing sheet is orthorhombic Ti—Al.

5. The structure of claim 1, wherein said metal foil further comprises nickel.

6. The structure of claim 5, wherein said metal foil further comprises zirconium.

7. The structure of claim 1, wherein said metal foil has a thickness of about 0.0008 to about 0.006 inches.

8. The structure of claim 7, wherein said metal foil has a thickness of about 0.002 inches.

9. The structure of claim 1, wherein said metal foil is formed by a rapid solidification process or a melt spinning process.

10. The structure of claim 1, wherein said braze assembly is heated at a temperature between 1700° F. and 2200° F.

11. The structure of claim 1, wherein said amount of time is between 1 and 150 minutes.

12. The structure of claim 1, wherein said braze assembly is heated in a vacuum furnace.

13. The structure of claim 2, wherein said at least one facing sheet has a thickness of about 0.007 to about 0.040 inches and said core is fabricated from γ-Ti—Al foil gauges having a thickness of about 0.004 inches.

14. The structure of claim 3, wherein said core is fabricated from orthorhombic Ti—Al foil gauges which have a thickness of about 0.003 inches.

15. The structure of claim 4, wherein said core is fabricated from orthorhombic Ti—Al foil gauges which have a thickness of about 0.003 inches.

16. A diffusion brazing method comprising:
    (a) providing a Ti—Al alloy honeycomb core having a faying surface and at least one Ti—Al alloy facing sheet having a faying surface;
    (b) contacting said honeycomb core faying surface and said at least one facing sheet faying surface, and positioning therebetween a metal braze filler foil containing copper, titanium, zirconium and optionally nickel, to form a braze assembly;
    (c) subjecting said braze assembly to sufficient positive pressure to maintain position and alignment for joining; and
    (d) heating said braze assembly for a sufficient amount of time to join said honeycomb core with said at least one facing sheet to form a titanium aluminide structure.

17. The method of claim 16, wherein said Ti—Al alloy of said honeycomb core and of said at least one facing sheet is γ-Ti—Al.

18. The method of claim 16, wherein said Ti—Al alloy of said honeycomb core is orthorhombic Ti—Al and said Ti—Al alloy of said at least one facing sheet is γ-Ti—Al.

19. The method of claim 16, wherein said Ti—Al alloy of said honeycomb core and of said at least one facing sheet is O—Ti—Al.

20. The method of claim 16, wherein said metal foil further comprises nickel.

21. The method of claim 20, wherein said metal foil further comprises zirconium.

22. The method of claim 16, wherein said metal foil has a thickness of about 0.0008 to about 0.006 inches.

23. The method of claim 16, wherein said metal foil has a thickness of about 0.002 inches.

24. The method of claim 16, wherein said metal foil is formed by a rapid solidification process or a melt spinning process.

25. The method of claim 16, wherein said braze assembly is heated at a temperature between 1700° F. and 2200° F.

26. The method of claim 16, wherein said amount of time is between 1 and 150 minutes.

27. The method of claim 16, wherein said braze assembly is heated in a vacuum furnace.

28. The method of claim 17, wherein said at least one facing sheet has a thickness of about 0.007 to about 0.040 inches and said core is fabricated from γ-Ti—Al foil gauges having a thickness of about 0.004 inches.

29. The method of claim 18, wherein said core is fabricated from orthorhombic Ti—Al foil gauges which have a thickness of about 0.003 inches.

30. The method of claim 19, wherein said core is fabricated from orthorhombic Ti—Al foil gauges which have a thickness of about 0.003 inches.

31. A titanium aluminide (Ti—Al) alloy honeycomb panel structure prepared by a diffusion brazing method comprising:
   (a) providing an orthorhombic Ti—Al alloy honeycomb core having a faying surface and at least one Ti—Al alloy facing sheet having a faying surface;
   (b) contacting the honeycomb core faying surface and the at least one facing sheet faying surface, and positioning therebetween a metal braze filler foil containing copper, titanium, and optionally nickel, to form a braze assembly;
   (c) subjecting the braze assembly to sufficient positive pressure to maintain position and alignment for joining; and
   (d) heating the braze assembly for a sufficient amount of time to join the honeycomb core with the at least one facing sheet.

32. A diffusion brazing method comprising:
   (a) providing an orthorhombic Ti—Al alloy honeycomb core having a faying surface and at least one Ti—Al alloy facing sheet having a faying surface;
   (b) contacting the honeycomb core faying surface and the at least one facing sheet faying surface, and positioning therebetween a metal braze filler foil containing copper, titanium, and optionally nickel, to form a braze assembly;
   (c) subjecting the braze assembly to sufficient positive pressure to maintain position and alignment for joining; and
   (d) heating the braze assembly for a sufficient amount of time to join the honeycomb core with the at least one facing sheet to form a titanium aluminide structure.

33. The structure of claim 31, wherein the Ti—Al alloy of the at least one facing sheet is selected from the group consisting of orthorhombic Ti—Al and γ-Ti—Al.

34. The method of claim 32, wherein the Ti—Al alloy of the at least one facing sheet is selected from the group consisting of orthorhombic Ti—Al and γ-Ti—Al.

* * * * *